(12) United States Patent
Vaara

(10) Patent No.: US 10,842,135 B2
(45) Date of Patent: Nov. 24, 2020

(54) DEVICE FOR UNCAPPING HONEYCOMBS

(71) Applicant: PARADISE HONEY OY, Porvoo (FI)

(72) Inventor: Juhani Vaara, Porvoo (FI)

(73) Assignee: PARADISE HONEY OY, Porvoo (FI)

( * ) Notice: Subject to any disclaimer, the term of this patent is extended or adjusted under 35 U.S.C. 154(b) by 0 days.

(21) Appl. No.: 16/371,457

(22) Filed: Apr. 1, 2019

(65) Prior Publication Data

US 2019/0223415 A1    Jul. 25, 2019

Related U.S. Application Data

(63) Continuation of application No. 15/105,890, filed as application No. PCT/FI2014/000042 on Dec. 22, 2014, now abandoned.

(30) Foreign Application Priority Data

Dec. 23, 2013  (FI) .................................. 20134275 U

(51) Int. Cl.
*A01K 59/02*    (2006.01)

(52) U.S. Cl.
CPC .................................... *A01K 59/02* (2013.01)

(58) Field of Classification Search
CPC ............................... A01K 59/00; A01K 59/02
See application file for complete search history.

(56) References Cited

U.S. PATENT DOCUMENTS

| | | |
|---|---|---|
| 249,881 A | 11/1881 | Bourgmeyer |
| 731,701 A | 6/1903 | Miller |
| 989,138 A | 4/1911 | Ferguson |
| 1,084,141 A | 1/1914 | Ferguson |
| 2,272,808 A | 2/1942 | McFadyen |

(Continued)

FOREIGN PATENT DOCUMENTS

| | | |
|---|---|---|
| AT | 304144 B | 12/1972 |
| DE | 1607333 B1 | 2/1970 |

(Continued)

OTHER PUBLICATIONS

International Search Report, dated Apr. 14, 2016, from corresponding PCT application No. PCT/FI2014/000042.

(Continued)

*Primary Examiner* — Lisa L Tsang
(74) *Attorney, Agent, or Firm* — Nixon & Vanderhye

(57) ABSTRACT

A device for uncapping wax cappings (13) that cover honeycombs (14). Before extracting, the sealed honeycombs (14) have to be uncapped in order to be able to spin the honey out of the honeycombs (14). The cutting system of this device allows, besides full-sized honeycombs (14), also a precise uncapping of undersized honeycombs (14) or shallow and deformed honeycomb structures, which cannot be uncapped using traditional cutting systems. The device includes rotatably mounted perforating elements (11, 12), and supporting elements (5, 6), on which the perforating elements (11, 12) are mounted. Secondly, the supporting elements are pivoted on a base for turning movement. Thirdly, the device has supporting elements equipped with a spring for pressing them against the honeycomb (14) with such a force that enables the piercing elements to go through the wax cappings (13) and into the honeycombs without damaging the other structures of honeycomb frame (2).

18 Claims, 5 Drawing Sheets

(56) References Cited

U.S. PATENT DOCUMENTS

| | | | |
|---|---|---|---|
| 2,531,709 | A | 11/1950 | Taylor |
| 3,068,496 | A | 12/1962 | Owens |
| 3,293,672 | A | 12/1966 | Gregersen |
| 4,765,008 | A | 8/1988 | Gunness |
| 5,295,894 | A | 3/1994 | De Cleroq |

FOREIGN PATENT DOCUMENTS

| | | |
|---|---|---|
| EP | 2314156 A1 | 4/2011 |
| FR | 2833137 A1 | 6/2003 |
| GB | 482237 A | 3/1938 |
| RU | 2041624 C1 | 8/1995 |
| WO | 03/047337 A1 | 6/2003 |

OTHER PUBLICATIONS

EP Communication, dated Jul. 14, 2017, from related EP application No. 14873172.2.

English Language Translation of WO 03/047337 A1, Application Publication Date: Jun. 12, 2003.

English Language Translation of RU 2041624 C1, Application Publication Date: Aug. 20, 1995.

DEVICE FOR UNCAPPING HONEYCOMBS

TECHNICAL FIELD

The aim of this invention is a device for uncapping honeycombs sealed with wax before extracting the honeycomb frame, including a mechanism for feeding the honeycomb frame into the machine.

BACKGROUND AND KNOWN TECHNOLOGY

The honeycombs taken from beehives are usually sealed with wax. Before processing the honey, the sealed honeycombs have to be uncapped in order to be able to spin the honey inside the honeycomb out of the honeycomb frames. After uncapping the honeycombs, the is frames are moved into the extractor, where honey comes out from the honeycombs because of the centrifugal force and drains into a tank. For uncapping the honeycombs there are nowadays several different uncapping devices that remove the wax cappings of the honeycomb using static or vibrating cutting knives.

In the device for uncapping the honeycombs according to the publication FR2833137A1 the cutting off of the wax cappings is implemented by rigid v-shaped heated cutting knives. These v-shaped blades do not vertically or horizontally tilt according to the surface of the wax combs, but cut off only the thicker parts than the outer covers of the honeycombs.

In this uncapping device there is often a scratching mechanism, which can be used for uncapping after knife uncapping system and which works reasonably only with full-sized and thick honeycomb frames. These scratching blades make smooth and shallow grooves on the surface of the wax cappings of the honeycombs nevertheless without entering inside the wax cappings of the honeycomb. This appurtenance is in that case unimportant, because a notable part of honeycomb frames are asymmetric or undersized and require manual uncapping afterwards.

Another uncapping device has been presented in the publication U.S. Pat. No. 2,272,808A. This uncapping device is equipped with an eccentric mechanism, with the help of which the cutting knives move back and forth cutting easily the thick honeycomb frames that bees produce during the main harvest season when using a smaller number of frames in beehives. During a bad summer and the spring and autumn harvest bees produce undersized honeycombs, which cannot be uncapped with straight cutting knives. In this case, uncapping the frames manually with a fork is necessary before extracting the honey.

The device according to the publication U.S. Pat. No. 3,068,496A has a rigid cylindrical rotating blade that rubs shallow grooves on the surface of the honeycomb when touching the thick wax capping of the honeycomb frame. Rubbing grooves are longitudinally and laterally formed on the surface of the cylindrical rotating blade. According to this publication, the purpose of the rigid cylinder is to rub smooth grooves, which are roughened with a scratching mechanism, on the surface of the honeycomb frame. In this scratching mechanism, the scratching spring loaded fingers function as teeth the purpose of which is to roughen the surface of the honeycomb. The rubbing mechanism of this device is not sufficient on the surface of the honeycomb, so the interior of the honeycombs remains intact and partially covered with wax. In this case, also after using the uncapping device, the honeycombs must be uncapped manually, otherwise even after extracting a lot of honey remains in the honeycombs because some of the honeycombs remain completely sealed.

The water heated uncapper device for removing the wax cappings according to the publication EP2314156A1 cuts and melts wax grooves onto the wax surface of the honeycombs when the device is strongly pressed against the wax covered surface of the honeycomb frame. The most of the wax grooves created by these means will quickly reseal themselves, because the melted wax immediately solidifies when in contact with the honey in the honeycombs. The purpose of the uncapping device is not to go under the surface of the honeycomb and therefore a part of the wax cap on the honeycomb frame remains intact preventing thereby the honey from flowing out from the honeycombs during the extraction. In this case, removing the wax cappings with a fork is once again necessary before extracting the honey. This method leads to the worst possible result and moreover, it is an arduous, slow and expensive way to destroy the beeswax by repeatedly overheating it.

SUMMARY OF THE INVENTION

The aim of this invention is to create a new device for uncapping the wax seal covering the honeycombs in honeycomb frames. A characteristic feature of the invention is that said device comprises also perforating elements, which are mounted freely rotatably, and supporting elements, on which said perforating elements are mounted.

A characteristic feature for one implementation of this invention is a base, on which the supporting elements are pivoted for turning movement.

Another characteristic feature for one implementation of this invention is that the device has supporting elements equipped with a member for pressing them from both sides of the honeycomb frame toward the surfaces of the honeycombs.

A still further characteristic feature for one implementation of this invention is that said member is a spring mounted between the supporting elements, pulling said supporting elements toward each other with a force that makes the perforating elements attached to said supporting elements pierce through the wax capping.

According to this device for uncapping honeycomb frames, the cutting knives cut the natural beeswax honeycombs and their seals that bees produce open. When the honeycomb frame moves forward in the device, the moving perforating elements pressed by springs go inside the wax cells of the honeycombs breaking thereby their covers. The movement of the perforating elements causes a flow of honey out from the honeycombs and also small amounts of wax stick to the honey. Using the uncapping device the uncapped honeycombs drain from honey while extracting more rapidly and the honeycombs will be emptier than they would be when uncapped in a traditional way. A remarkable benefit of using this uncapping device compared to other devices for uncapping honeycomb frames is that no additional uncapping with a fork tool is necessary. After the extraction of honey, the amount of honey possibly still remaining in the honeycomb frames is remarkably smaller than by using other known devices for uncapping honeycomb frames. It is to mention that the uncapping done manually using the fork tool is physically exhausting for the worker and it also slows down the processing of honey.

BRIEF DESCRIPTION OF THE DRAWINGS

In the following the invention is now described more in detail taken in connection with accompanying drawings, wherein.

DETAILED DESCRIPTION OF THE INVENTION

Figure 1:
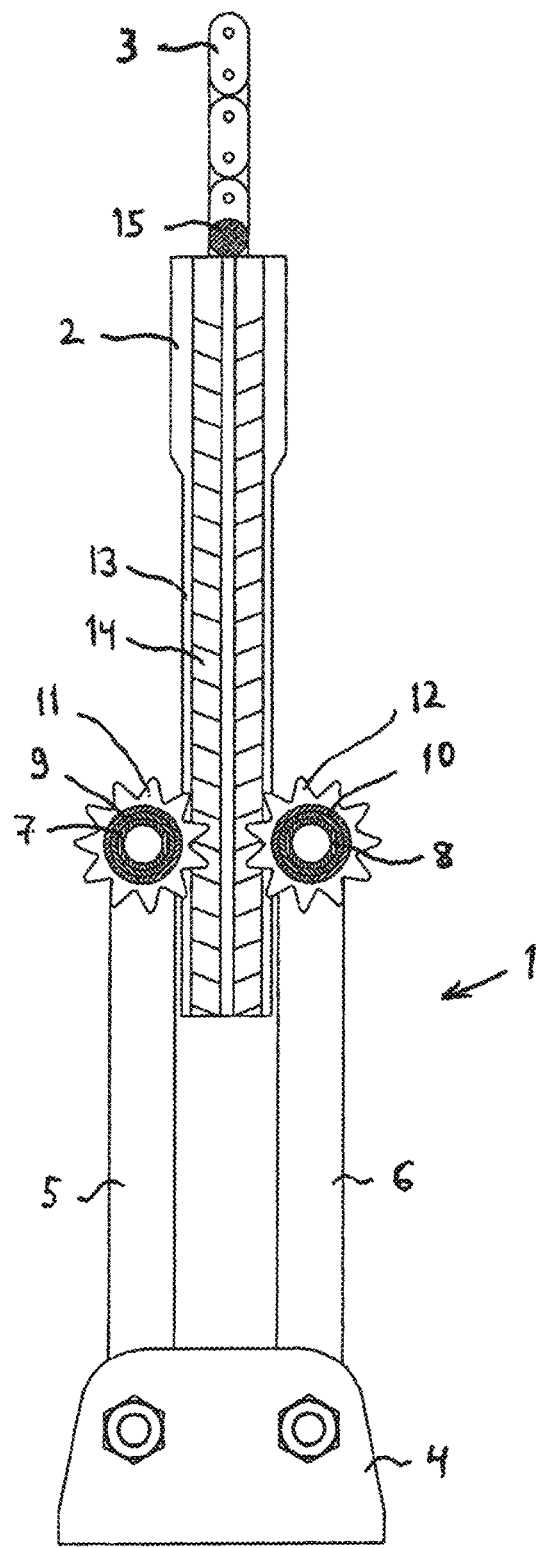
FIG. 1 is a drawing showing the functioning principle of the present invention, wherein the honeycomb frame is moving vertically upwards and downwards, while the springs press the rotating blades against the wax covered surface of the honeycomb frames.
Figure 2:
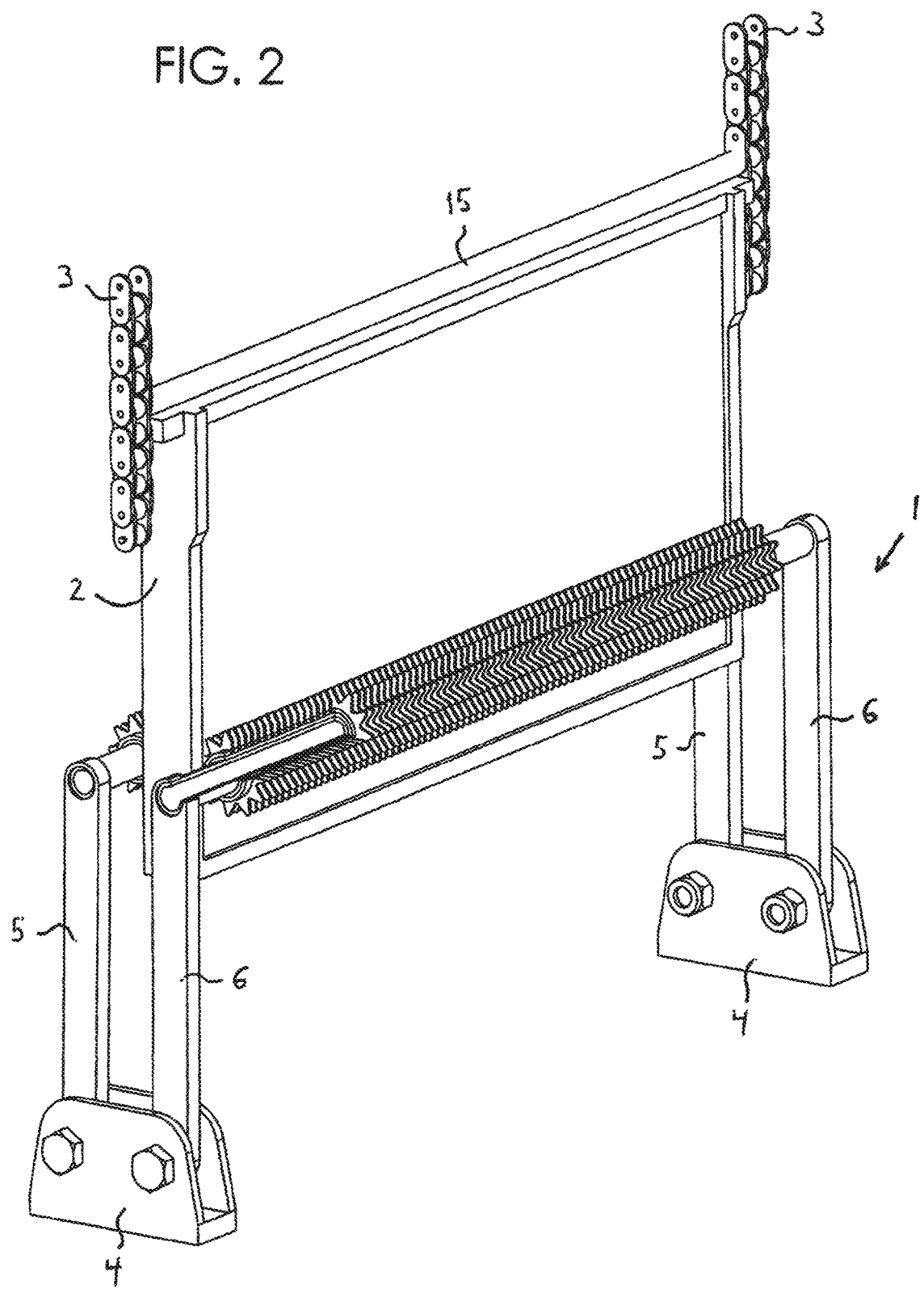
FIG. 2 is a view of the blade shaft assembly, on which the blades and the washers for separating said blades are mounted on a slide bearing.
Figure 3:
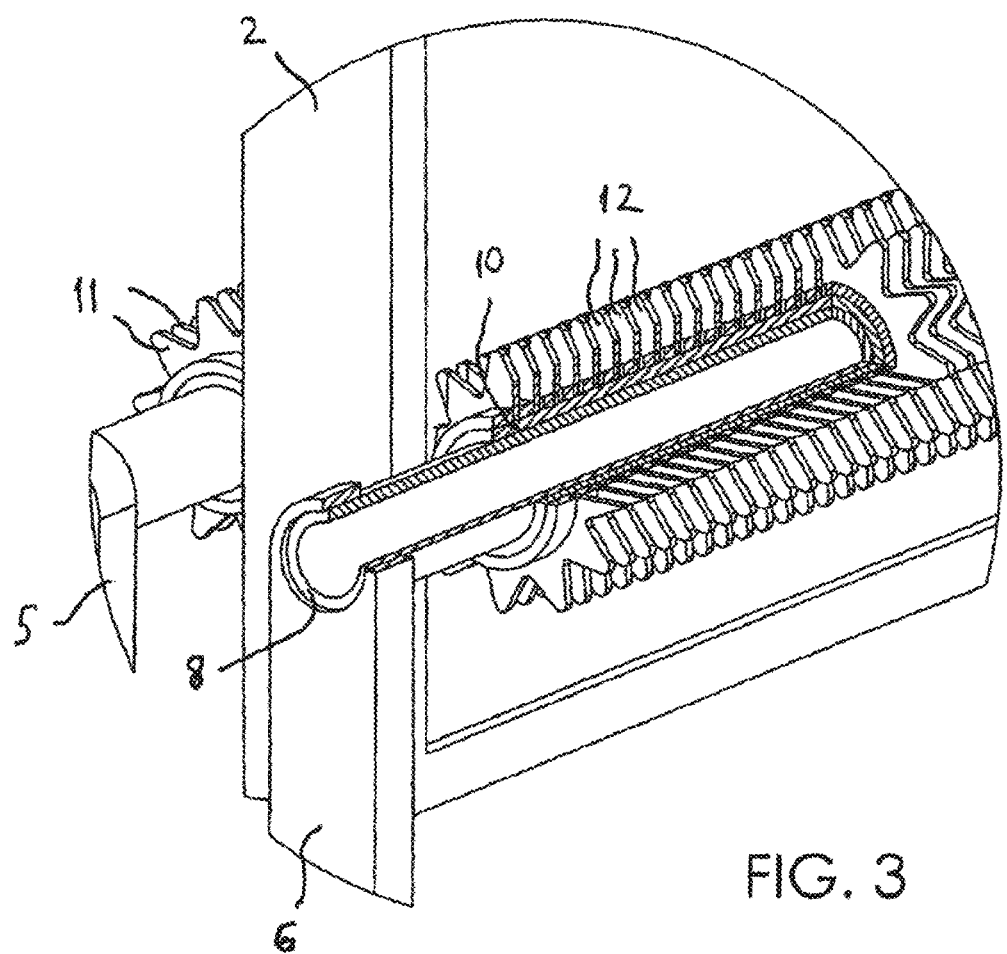
FIG. 3 is a cut view of the blade shaft assembly, wherein all the blades are mounted on the same shaft with the help of a slide bearing.
Figure 4:
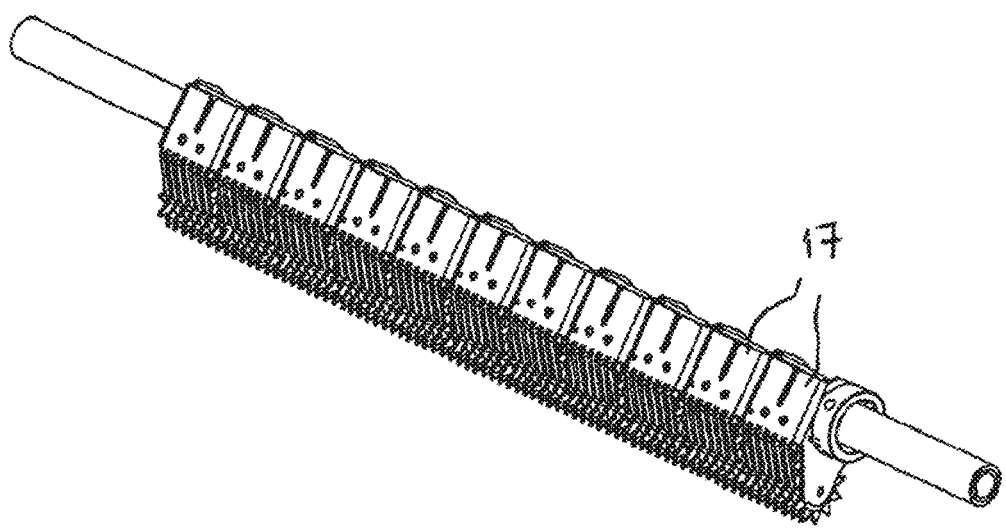
FIG. 4 is a view of the blade shaft assembly, wherein sets of blades are separately pivoted and pressed by springs.
Figure 5:
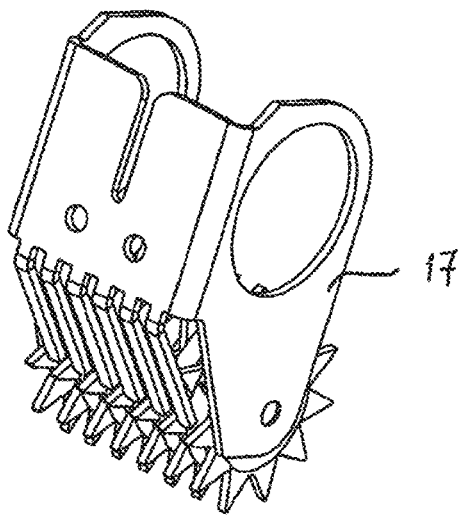
FIG. 5 is a drawing of one set of blades including seven blades.

The device 1 and the honeycomb frame 2 according to the present invention are shown in the drawings FIG. 1 and FIG. 2. The honeycomb frame 2 travels in this implementation example vertically with the help of the chain mechanism 3, only a small portion of said chain mechanism is shown in the drawings. The device 1 consists of a base 4, on which the supporting elements 5 and 6 are rotatably pivoted, using means shown more precisely on FIG. 2. The blade shafts 7 and 8 are mounted on said supporting elements 5 and 6. Said supporting elements 5 and 6 consist thereby of two essentially vertical bars, between of which said blade shafts are mounted. The freely rolling rotating blades 11 and 12 are mounted using slide bearings 9 and 10 on the blade shafts 7 and 8. On said rotating blades there are several teeth, for instance about 8-12 of them. The rotating blades do not necessarily have to be mounted freely rotatably.

In the device 1 the blade shafts 7 and 8 are being pushed toward each other. This has been achieved for example by mounting a tension spring between the supporting elements that pulls the supporting elements toward each other. Instead of the tension spring, in some cases also a thrust spring can be used. Pressing the rotating blades against the honeycombs can be implemented by also using other means than springs. The blade shafts 7 and 8 are pressed against the surfaces of the honeycomb frames with such a force that the piercing teeth of the rotating blades go through the wax capping 13 into wax cells of the honeycomb 14 without yet damaging the other structures of the honeycomb frame. When the honeycomb frame 2 is moved downwards with the help of the chain mechanism 3, the rotating blades rotate with the movement of the honeycomb frame and break through the wax seal 2 covering each wax cell of the honeycomb 14.

The full honeycomb frames 2 are being separately lifted either manually or lifter assisted on the slide feed magazine, from where they are being manually fed one by one, or the frames move with the help of an automatic feed mechanism into this device. The separate electrically or manually operated, bilaterally placed feed mechanism 3 is connected by a shaft 15, which presses the honeycomb frame downwards through the uncapping mechanism.

The conveyor mechanism 3, 15 for the honeycomb frame 2 pushes the honeycomb frames one by one through the heated cutting knives of the uncapping device (not shown in the drawings). Said cutting knives cut the oversized honeycomb structure from both sides of the frame, after which the thickness of the frames is about 20-24 millimetres. The thick honeycomb frames are only built during a good main harvest season. Before and after the main harvest season usually undersized honeycombs are built. These shallow and deformed honeycomb structures cannot be uncapped by straight cutting knives, but the device according to this invention solves this problem, said device functioning together with said cutting knives in the same uncapping device or without the cutting knives as a separate device that works at its own for uncapping honeycombs.

In this mechanism, the independently rotating metallic or plastic rotating blades 11 and 12 are mounted on a slide bearing on the blade shafts 7 and 8, said blade shafts 7 and 8 being symmetrically placed on both sides of the frame. The rotating blades can also be mounted on the spin axis on the separate and independently moving sets of blades 17 (drawings 4 and 5), when each set of blades is independently pivoted and pressed against the surface of wax capping 13 for instance by using a spring. The rotating blades 11 and 12 can likewise be directly mounted on a hollow blade shaft.

The amount of rotating blades of each set of blades 17 varies according to the size of the honeycomb and the dimensions of the honeycomb frame. The pivoted spin axes are loaded by an external force so that they are pressed against the honeycombs of the frame in the uncapping device, when the piercing teeth of the rotating blades perforate the wax capping of the honeycombs while rolling on the wax capping 13. Some honey sticks to the piercing teeth of the uncapping device inside the wax cells, and when the movement of piercing teeth is because of the rotary movement of the rotating blade directed outward from the honeycomb, the piercing teeth pull out some mixture of honey and beeswax. The effect of the rotating blades does not depend on the viscosity of honey or the origin of honey. The heating water or the water vapour that adjusts the temperature of the rotating blades can be connected to run inside the blade shaft of the rotating blades. The rotating blades heat up to the desired temperature because of the heat conducting from the spin axis of said rotating to blades. To same extent, also an electric heating resistor can be mounted inside the blade shaft. The rotating blades 11, 12 with piercing teeth rotate independently around their spin axes each at their own rotating speed. The force used by the piercing teeth for piercing the wax capping 13 of the honeycomb is adjustable for example with is a spring, as described above, or using a weight or a similar arrangement. The uncapped honeycombs are emptier from honey after the extraction and the time used for extracting is remarkably shorter than by using traditional methods for uncapping the honeycomb frames.

For a professional beekeeper it is obvious that the invention is not restricted to said implementation examples, but it can be varied within the given claims.

The device is described above as vertically functioning. It could work though in another direction as well, for instance laterally (in horizontal direction).

Further on, it is possible that the rotating blades are mounted on separate blade shafts, which are placed on the same or even on different positions of the spin axes.

Various embodiments may include any of the above characteristic features, either alone or in any suitable combination.

The invention claimed is:

1. A device for uncapping wax-sealed honeycombs of a honeycomb frame before extracting the honeycomb frame, the honeycomb frame having a top, a bottom, a first end side that extends between the top and the bottom, and a second end side that extends between the top and the bottom, the second end side being opposite the first end side, a surface extending between the first end side and the second end side, a honeycomb located within the honeycomb frame includes a first side wax capping and a second side wax capping opposite the first side wax capping, the device comprising:

a feed mechanism having a shaft and a first chain mechanism and a second chain mechanism, bilaterally placed with respect to the honeycomb frame, respectively on a first end of the shaft and a second end of the shaft so that the first chain mechanism and the second chain mechanism are connected by the shaft, wherein the shaft in operation presses the top of the honeycomb frame downwards, the first and second chain mechanisms being operative to feed the honeycomb frame into the device;

a first set of supporting elements positioned at a first location at the first end side of the honeycomb frame and a second set of supporting elements positioned at a second location at the second end side of the honeycomb frame so that the first and second sets of supporting elements are bilaterally placed with respect to the honeycomb frame respectively adjacent the first and second end sides of the honeycomb frame;

a first blade shaft mounted on a first element of the first set of supporting elements and on a first element of the second set of supporting elements, the first element of the first set of supporting elements and the first element of the second set of supporting elements each being rotatably pivoted;

a second blade shaft mounted on a second element of the first set of supporting elements and a second element of the second set of supporting elements, the second element of the second set of supporting elements and the second element of the second set of supporting elements each being rotatably pivoted;

freely rotating blades, each of the blades having plural piercing teeth, sets of the blades being mounted together;

plural bracket elements, each of the bracket elements comprising a pair of end parts joined together by an intermediate part, each of the end parts including an aperture for mounting the bracket element on one of the first and second blade shafts, each one of the sets of the blades being mounted together on a spin axis of a respective one of the bracket elements, each of the bracket elements being mounted, via the aperture of the end parts, on one of the first and second blade shafts so that the bracket elements are independently pivoted on the first and second blade shafts and the blades rotate on the spin axis, offset from the first and second blade shafts, wherein the shaft in operation presses the top of the honeycomb frame downwards through and between said first and second blade shafts and between the sets of the blades mounted thereon such that the piercing teeth of the blades are pressed against the first and second side wax cappings of the honeycomb within the honeycomb frame with each of said sets of the blades being individually rotatably mounted on the spin axis within the bracket elements, wherein each of said sets of the blades is individually pivoted and pressed against a respective one of the first side and second side wax cappings of the honeycomb located within the honeycomb frame such that at least a first one of said set of the blades is pressed against the first side wax capping on a first side of the honeycomb frame and at least a second one of said set of the blades is pressed against the second side wax capping on a second side of the honeycomb frame, each blade of each of said sets of the blades being individually rotatable freely with respect to other blades of each of said sets of the blades, the blades rotating around the spin axis based on movement of the honeycomb frame between said sets of said first and second blade shafts, the movement of the honeycomb frame being provided by the first chain mechanism and the second chain mechanism of the feed mechanism; and wherein the first and second sets of supporting elements provide a force that makes the piercing teeth of the rotating blades pierce through the wax cappings during rotation of the rotating blades while rolling on the wax cappings based on the movement of the honeycomb frame between said sets of the blades mounted on the first and second blade shafts, the piercing teeth of the rotating blades being pressed to go inside wax cells of the honeycombs, thereby breaking the wax cappings and providing spaced apart perforations on the wax cappings, through which perforations honey may flow out from the honeycombs.

2. The device according to claim 1, wherein the device further comprises a base, on which the first and second set of supporting elements are rotatably pivoted.

3. The device according to claim 2, wherein the first and second sets of supporting elements are equipped with a member for pressing the piercing teeth against surfaces of the honeycomb.

4. The device according to claim 3, wherein the member is a spring mounted between the first and second elements of each of the sets of supporting elements that pulls the first and second elements of each of the sets of supporting elements toward each other, the spring providing the force that makes piercing teeth of the rotating blades pierce through the wax cappings during rotation of the rotating blades while rolling on the wax cappings based on the movement of the honeycomb frame between said sets of the blades.

5. The device according to claim 4, wherein the rotating blades are star-shaped rotating blades, comprising each from 8 to 12 piercing teeth.

6. The device according to claim 5, a length of one of the first and second blade shafts is at least the same as a length of the honeycombs in the honeycomb frame.

7. The device according to claim 3, wherein the rotating blades are star-shaped rotating blades, comprising each from 8 to 12 piercing teeth.

8. The device according to claim 7, a length of one of the first and second blade shafts is at least the same as a length of the honeycombs in the honeycomb frame.

9. The device according to claim 2, wherein the rotating blades are star-shaped rotating blades, comprising each from 8 to 12 piercing teeth.

10. The device according to claim 9, wherein a length of one of the first and second blade shafts is at least the same as a length of the honeycombs in the honeycomb frame.

11. The device according to claim 1, wherein the first and second sets of supporting elements are equipped with a spring mounted between the first and second elements of each of the sets of supporting elements for pressing the piercing teeth against surfaces of the honeycomb.

12. The device according to claim 11, wherein the spring mounted between the first and second elements of each of the sets of supporting elements pulls the first and second elements of each of the sets of supporting elements toward each other, the spring providing the force that makes the rotating piercing teeth pierce through the wax cappings during rotation of the rotating blades while rolling on the wax cappings based on the movement of the honeycomb frame between said sets of the blades.

13. The device according to claim 12, wherein the rotating blades are star-shaped rotating blades, comprising each from 8 to 12 piercing teeth.

14. The device according to claim 13, a length of one of the first and second blade shafts is at least the same as a length of the honeycombs in the honeycomb frame.

15. The device according to claim 11, wherein the rotating blades are star-shaped rotating blades, comprising each from 8 to 12 piercing teeth.

16. The device according to claim 15, a length of one of the first and second blade shafts is at least the same as a length of the honeycombs in the honeycomb frame.

17. The device according to claim 1, wherein the rotating blades are star-shaped rotating blades, comprising each from 8 to 12 piercing teeth.

18. The device according to claim 17, wherein a length of one of the first and second blade shafts is at least the same as a length of the honeycombs in the honeycomb frame.

* * * * *